United States Patent
Marovic et al.

(10) Patent No.: US 6,520,345 B1
(45) Date of Patent: Feb. 18, 2003

(54) SELF-SQUARING RELAY RACK ASSEMBLY

(75) Inventors: Marjana Marovic, Kingston, RI (US); Lee M. Drozdenko, Middletown, CT (US); Steven O. Fournier, Southington, CT (US); Robert C. Baxter, Warwick, RI (US)

(73) Assignee: Hubbell Incorporated, Orange, CT (US)

( * ) Notice: Subject to any disclaimer, the term of this patent is extended or adjusted under 35 U.S.C. 154(b) by 41 days.

(21) Appl. No.: 09/671,175

(22) Filed: Sep. 28, 2000

(51) Int. Cl.[7] .................................................. A47F 7/00
(52) U.S. Cl. ........................................ 211/26; 211/183
(58) Field of Search ........................ 211/26, 189, 183, 211/191, 192, 41.17; 403/252, 260; 361/724, 826, 829; 312/265.1; 482/94

(56) References Cited

U.S. PATENT DOCUMENTS

| | | | | |
|---|---|---|---|---|
| 3,527,280 A | * | 9/1970 | MacNorius | 403/252 |
| 3,816,011 A | * | 6/1974 | Biebuyck et al. | 403/252 |
| 4,648,517 A | * | 3/1987 | Schafer | 211/183 |
| 4,715,502 A | * | 12/1987 | Salmon | 211/26 |
| 5,788,087 A | | 8/1998 | Orlando | |
| 5,810,501 A | * | 9/1998 | Ross | 403/231 |
| 5,829,601 A | * | 11/1998 | Yurchenco et al. | 211/41.17 |
| 5,975,315 A | * | 11/1999 | Jordan | 211/26 |
| 5,992,808 A | * | 11/1999 | Morrow | 211/26 |
| 6,019,446 A | * | 2/2000 | Laboch et al. | 312/265.1 |
| 6,112,911 A | * | 9/2000 | Laurx | 211/41.17 |
| 6,123,203 A | * | 9/2000 | Gibbons | 211/26 |
| 6,164,460 A | * | 12/2000 | Reuter | 211/26 |
| 6,238,029 B1 | * | 5/2001 | Marzee et al. | 312/265.3 |
| 6,293,637 B1 | * | 9/2001 | Anderson et al. | 312/265.1 |
| 6,299,268 B1 | * | 10/2001 | Carle et al. | 312/265.4 |
| 6,315,132 B1 | * | 11/2001 | Hartel et al. | 211/26 |
| 6,318,680 B1 | * | 11/2001 | Benedict et al. | 211/41.1 |
| 6,321,917 B1 | * | 11/2001 | Mendoza | 211/26 |

OTHER PUBLICATIONS

Hubbell Premise Wiring Catalog, prior to Dec., 1999, pp. 1, 90, 92–94 and 106.

* cited by examiner

Primary Examiner—Daniel P. Stodola
Assistant Examiner—Jennifer E. Novosad
(74) Attorney, Agent, or Firm—Alfred N. Goodman; Mark S. Bicks; Tara L. Hoffman (57) ABSTRACT

A relay rack assembly for the management of cross-connect products and a multiplicity of wires includes a base and top, each base and top having a plurality of guide portions extending therefrom, each guide portion including an engaging rib. Vertical members are coupled between the base and top by slots disposed in the sides of the vertical members receiving an engaging rib on the base and top. First and second fastener inserts are coupled to both the vertical members and the base and top, respectively, thereby securing the vertical members to the base and top. The attachment of the first and second fastener inserts and the engagement of the engaging ribs of the base and top and the slots of the vertical members supports the vertical members substantially square or perpendicularly to the base and top of the rack.

32 Claims, 7 Drawing Sheets

SELF-SQUARING RELAY RACK ASSEMBLY

FIELD OF THE INVENTION

The present invention relates to a relay rack assembly for management of cross-connect products and various cable wires. More specifically, the relay rack assembly is designed and assembled to be self-squaring in which the vertical members of the rack are substantially perpendicular to the top and base of the rack.

BACKGROUND OF THE INVENTION

Relay racks provide an efficient method of managing cross-connect products and a multiplicity of wires, such as cable and optical fiber. The racks are typically used in a termination closet and support patch panels, cable management panels, and power distribution equipment. The racks can also be used to hold equipment such as small routers and servers, monitors, and key boards. In addition, cable management channels are typically mounted on the outside of the vertical supports of the rack.

Conventional relay racks employ two vertical support members fixedly attached at both ends to a pair of top and bottom support flanges. The conventional racks require numerous steps and a plurality of fasteners to properly secure the vertical supports to the top and bottom flanges, resulting in inefficiency and increased costs in manufacturing and assembling the rack. In particular, the vertical supports must be bolted to one of either the top or bottom pair of flanges using a number of nut and bolt attachments. This step must then be repeated to attach the other pair of flanges to the vertical supports.

In addition, the conventional relay racks fail to ensure that the vertical supports will be square or substantially perpendicular to the support flanges. Thus, once the rack is assembled, the vertical supports may be improperly angled with respect to the support flanges, thereby resulting in either the rack falling down or its inability to properly support the cross connect products. This requires disassembly and reassembly of the rack.

An example of a prior art cross-connect product is disclosed in U.S. Pat. No. 5,765,698 to Bullivant.

SUMMARY OF THE INVENTION

Accordingly, an object of the present invention is to provide a relay rack assembly that is self-squaring.

Another object of this invention is to provide a relay rack assembly that requires only a few assembly steps to arrange the vertical supports of the rack square with the top and bottom supports of the rack.

A further object of the invention is to provide a relay rack assembly that provides proper securing of the vertical supports with respect to the top and bottom supports with minimal fasteners.

Yet another object of this invention is to provide a relay rack assembly that is cost effective to manufacture and assemble.

The foregoing objects are basically attained by a relay rack assembly, comprising a base having upper and lower surfaces, and a first guide portion extending from the upper surface and having a first engaging rib extending therefrom; a first vertical member coupled at one end to the base and having a main wall, and a first sidewall extending from the main wall, the main wall including a first fastener upwardly facing surface proximate the one end, and the first sidewall including a first slot engaging the first engaging rib of the base; and a first fastener insert having first and second portions, the first portion being engaged with the first fastener upwardly facing surface of the first vertical member and the second portion being releasably attached to the upper surface of said base, whereby the attachment of the first fastener insert and the engagement of the first engaging rib and the first slot supports the first vertical member substantially perpendicular to the base.

The foregoing objects are also attained by a method of assembling a vertical member with a base, the vertical member having a main wall and a first sidewall extending from the main wall, the main wall includes a first fastener opening, and the first sidewall includes a first slot, and the base having upper and lower surfaces, and a first guide portion extending from the upper surface, the first guide portion having a first engaging rib extending therefrom, comprising the steps of: placing the first sidewall of the vertical member adjacent the first guide portion of the base; sliding the vertical member downwardly with respect to the first guide portion until the vertical member abuts the upper surface of the base such that the first slot of the first sidewall engages the first engaging rib of the first guide portion; inserting a fastener insert having first and second portions into the fastener opening in the main wall of the vertical member; and attaching the second portion of the fastener insert to the upper surface of the base with the first portion of the fastener insert remaining in the fastener opening thereby squaring the vertical member with respect to the base.

By structuring the relay rack in this manner and assembling it in this fashion, minimal steps and fasteners are required to properly secure the rack with the vertical supports of the rack being square to the top and base supports.

Other objects, advantages and salient features of the invention will become apparent from the following detailed description which taken in conjunction with annexed drawings, discloses the preferred embodiment of the present invention.

BRIEF DESCRIPTION OF THE DRAWINGS

Referring to the drawings which form a part of this disclosure.

DETAILED DESCRIPTION OF THE INVENTION

Referring to FIGS. 1–13, a self-squaring relay rack assembly 10 according to the present invention generally comprises a base support 12, a top support 14, and first and second vertical members 16 and 18 disposed between the base and top supports 12 and 14 and secured thereto by a plurality of fastener inserts 20, 22, 24, and 26. The method of assembling relay rack 10 and the structure of relay rack 10 ensures that the vertical members 16 and 18 will be substantially square with base and top supports 12 and 14, thereby eliminating errors in assembly. Relay rack 10 can hold various types of electrical equipment, such as a cross connect panel or product 28, as is well known in the art. The electrical equipment in turn is connected to various cable wires, such as telephone and power lines for distribution throughout a space, such as an office.

Figure 2:
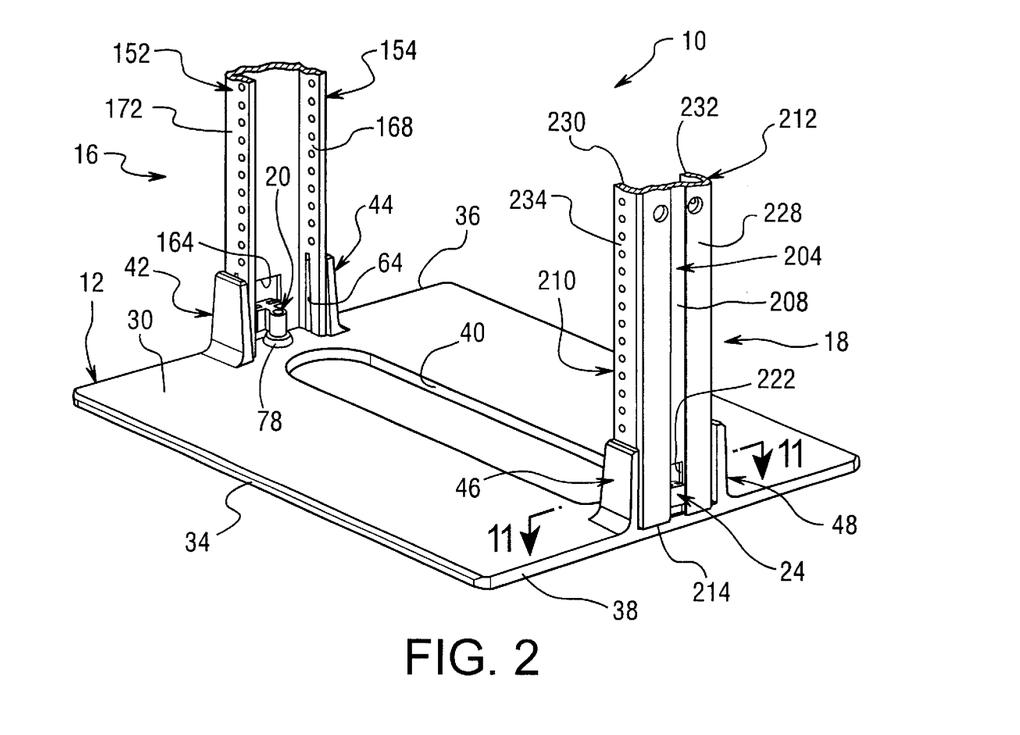
FIG. 2 is a partial, enlarged perspective view in elevation of the relay rack assembly illustrated in FIG. 1, showing the engagement of a base support and vertical members of the relay rack assembly.
Figure 3:
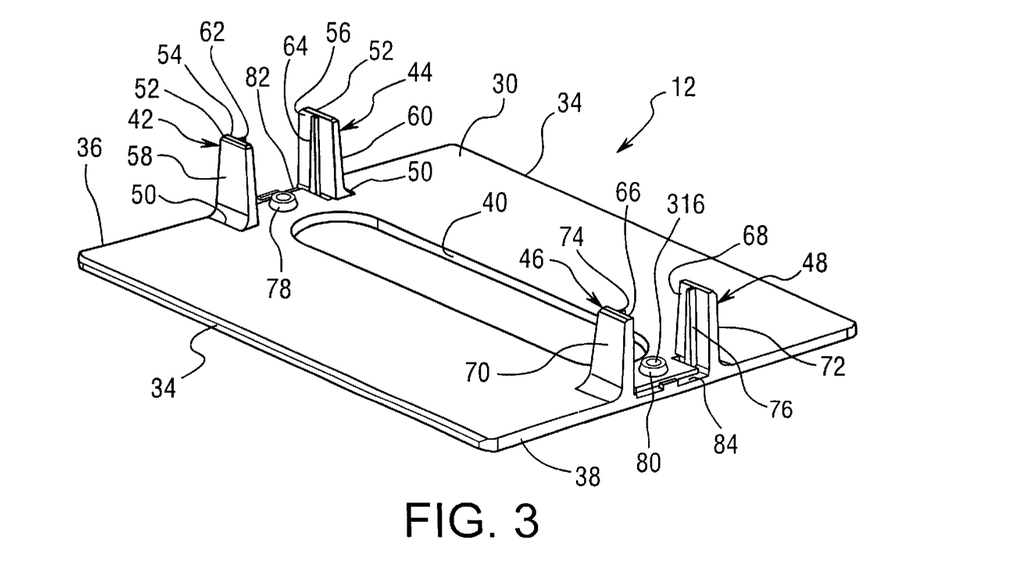
FIG. 3 is a perspective view of the base support of the relay rack assembly illustrated in FIG. 1.

Base or base support 12 specifically includes substantially planar and parallel upper and lower surfaces 30 and 32 where lower surface 32 is located opposite upper surface 30. Base 12 also includes two generally parallel and opposing sides 34, and two generally parallel and opposing first and second ends 36 and 38 extending between sides 34 thereby forming a substantially rectangular shaped base 12, as best seen in FIGS. 2 and 3. Although it is preferable that base 12 be rectangular in shape, base 12 can be of an polygonal or circular shape, as long as upper and lower surfaces 30 and 32 are substantially flat and parallel. A central oval shaped aperture 40 is disposed in base 12 to facilitate the manufacturing process and reduce costs therein. Thus, the central aperture is not required and can be any desired shape, such as rectangular or circular.

Upper surface 30 particularly includes first and second guide portions 42 and 44 disposed adjacent first end 36 forming a first pair of guides for receiving first vertical member 16. Remote from first and second guide portions 42 and 44, third and fourth guide portions 46 and 48 are disposed on upper surface 30 adjacent second end 38 forming a second pair of guides for receiving second vertical member 18. Although it is preferable that guide portions 42 and 44 be disposed adjacent first end 36, and guide portions 46 and 48 be disposed adjacent second end 38, the guide portions can be spaced from the ends 36 and 38. Each of the guide portions 42, 44, 46, and 48 extend upwardly from upper surface 30 with a bottom end 50 of each guide portion 42, 44, 46, and 48 being connected to base 12 and a top end 52 being a free end so that each guide portion 42, 44, 46, and 48 is substantially perpendicular to upper surface 30 of base 12, as seen in FIG. 3. Guide portions 42, 445 46, and 48 can either be unitarily formed with base 12 or separately formed and fixedly connected therewith.

First and second guide portions 42 and 44 each have an inner engaging surface 54 and 56, respectively, where inner surface 54 of first guide portion 42 faces inner surface 56 of second guide portion 44, and vice versa, forming a space therebetween for receiving first vertical member 16. Inner surfaces 54 and 56 are generally planar. Opposite inner engaging surface 54 and 56 are outer surfaces 58 and 60 of first and second guide portions 42 and 44, respectively. Outer surface 58 and 60 are slightly tapered from their bottom ends 50 to there top ends 52 to provide strength to the guide portions. However, outer surfaces 58 and 60 can be planar.

Disposed along each inner engaging surface 54 and 56 of first and second guide portions 42 and 44 are first and second outwardly extending engaging ribs 62 and 64, respectively, that extend from their top ends 52 to their bottom ends 50. First and second engaging ribs 62 and 64 are centrally disposed on inner surfaces 54 and 56 and are generally perpendicular to upper surface 30 of base 12.

Third and fourth guide portions 46 and 48 are substantially identical to first and second guide portions 42 and 44. Similar to first and second guide portions 42 and 44, each of third and fourth guide portions 46 and 48 have an inner engaging surface 66 and 68, respectively, where inner surface 66 of third guide portion 42 faces inner surface 68 of fourth guide portion 48, forming a space therebetween for receiving second vertical member 18. Outer surfaces 70 and 72 are slightly tapered from bottom ends 50 to top ends 52, like outer surfaces 58 and 60 of first and second guide portions 42 and 44. Outer surfaces 70 and 72, however, can also be planar.

Third and fourth guide portions 46 and 48 also include third and fourth engaging ribs 74 and 76, respectively, that extend outwardly and along inner surfaces 66 and 68, respectively, from the top ends 52 to the bottom ends 50 of third and fourth guide portions 46 and 48. Like ribs 62 and 64 of first and second guide portions 42 and 44, third and fourth ribs 74 and 76 are centrally disposed on third and fourth guide portions 46 and 48, respectively, and are substantially perpendicular to upper surface 30 of base 12.

Although ribs 62, 64, 74 and 76, of first, second, third, and fourth guide portions 42, 44, 46, and 48, respectively, are shown as being centrally located, ribs 62, 64, 74 and 76 can be located anywhere on inner surfaces 54, 56, 66, and 68, respectively, such as to one side or the other, as long as ribs 62, 64, 74, and 76 are generally perpendicular to upper surface 30. In addition, it is not necessary that ribs 62, 64, 74 and 76 extend from top ends 52 to bottom ends 50, rather, they can extend any distance along inner surfaces 54, 56, 66, and 68, respectively, such as half or three-fourths of the distance defined between top ends 52 and bottom ends 50 of first, second, third, and fourth guide portions 42, 44, 46, and 48.

In the space between first and second guide portions 42 and 44, a fastener stop 78 is disposed on upper surface 30, as best seen in FIG. 3. Likewise, in the space between third and fourth guide portions 46 and 48 is located another fastener stop 80. Fastener stops 78 and 80 engage first and second fastener inserts 20 and 22 and can be integrally formed with base 12 or separately formed and attached to base 12 by any known attachment. Also in the spaces between the guide portions are first and second shallow grooves 82 and 84, respectively. Specifically, first groove 82 is located between first and second guide portions 42 and 44 along first end 36 of base 12 and along the bottom ends 50 of guide portions 42 and 44. Similarly, second groove 84 is located between third and fourth guide portions 46 and 48 along second end 38 of base 12 and along the bottom ends 50 of guide portions 46 and 48. Grooves 82 and 84 receive first and second vertical members 16 and 18, respectively, thereby ensuring proper position of the vertical members 16 and 18 with respect to guide portions 42, 44, 46, and 48.

Figure 1:
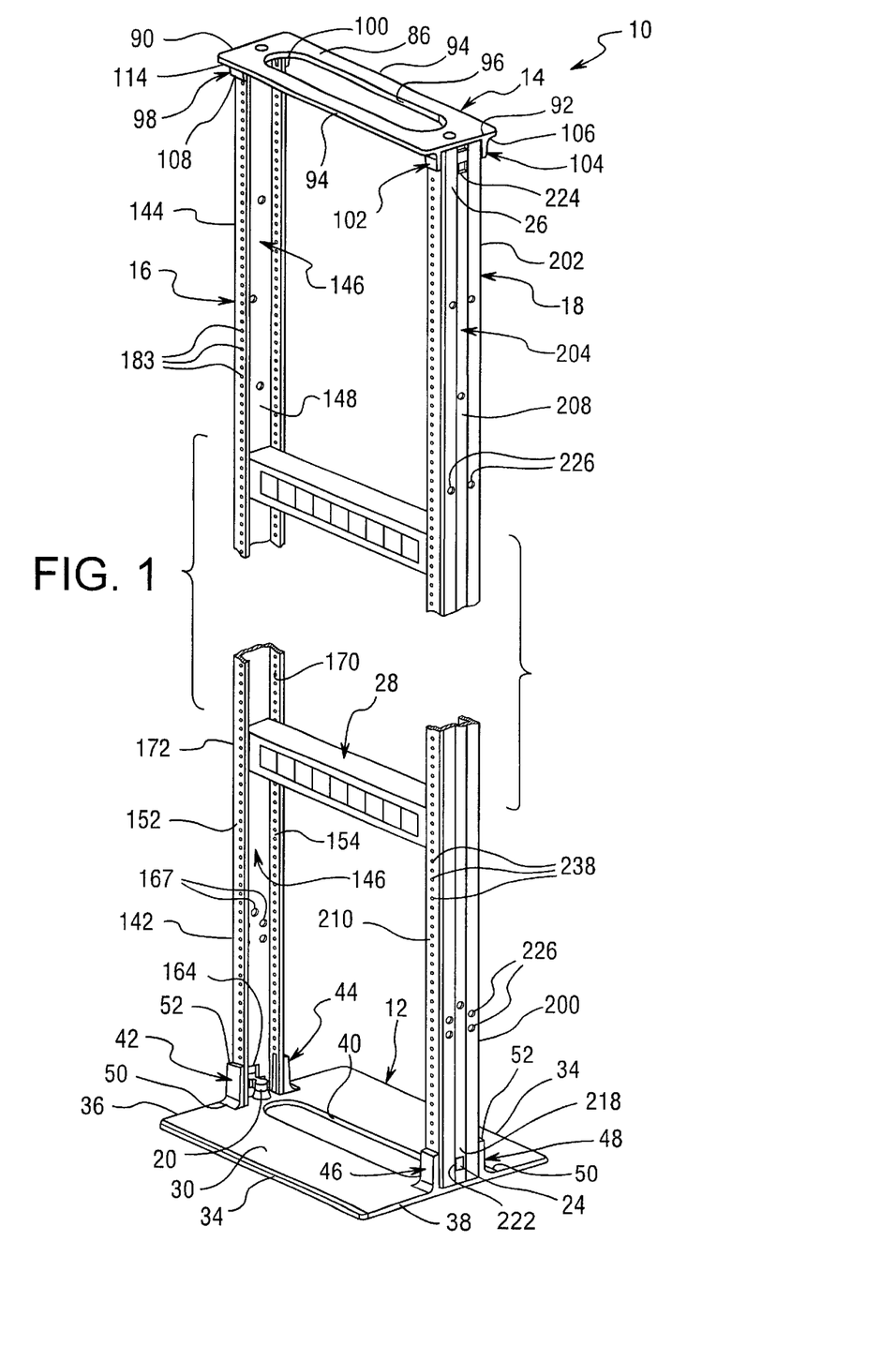
FIG. 1 is a perspective view in elevation of a relay rack assembly according to an embodiment of the present invention.

Top support or top 14 is substantially similar to base 12. Top 14 particularly includes substantially planar opposing upper and lower surfaces 86 and 88, and two generally parallel and opposing first and second ends 90 and 92 extending between sides 94, thereby forming a substantially rectangular shaped top 14. Ends 90 and 92 have a length substantially less than ends 36 and 38 of base 12 to save material costs, with sides 94 of top 14 being generally the same length of sides 34 of base 12, as seen in FIG. 1. However, ends 90 and 92 can be of any desired length, such as equal to the length of ends 36 and 38 of base 12. Like base 12, although it is preferable that top 14 be rectangular in shape, top 14 can be of an polygonal or circular shape, as long as upper and lower surfaces 86 and 88 are substantially flat and parallel. Similar to central aperture 40 in base 12, top 14 includes a central oval shaped aperture 96.

Figure 4:
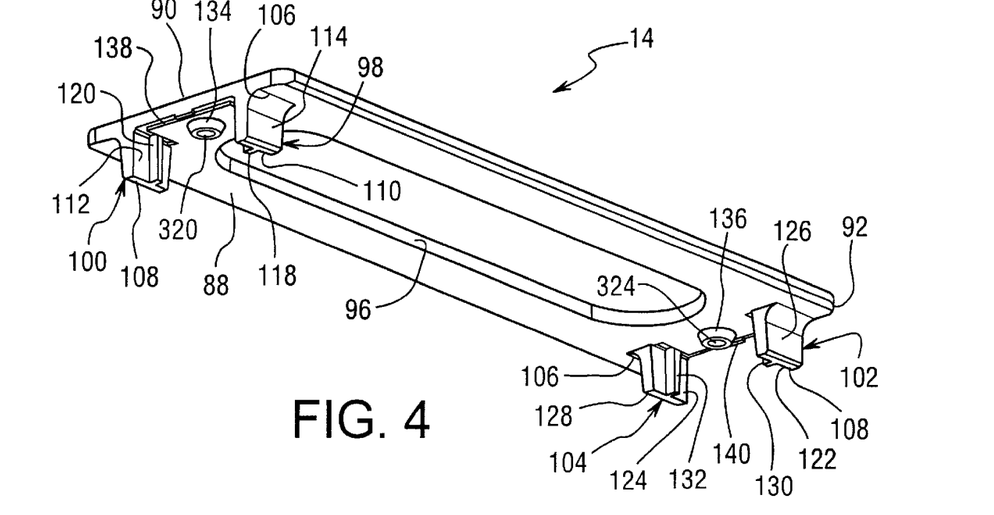
FIG. 4 is a perspective view of a top support of the relay rack assembly illustrated in FIG. 1.
Figure 13:
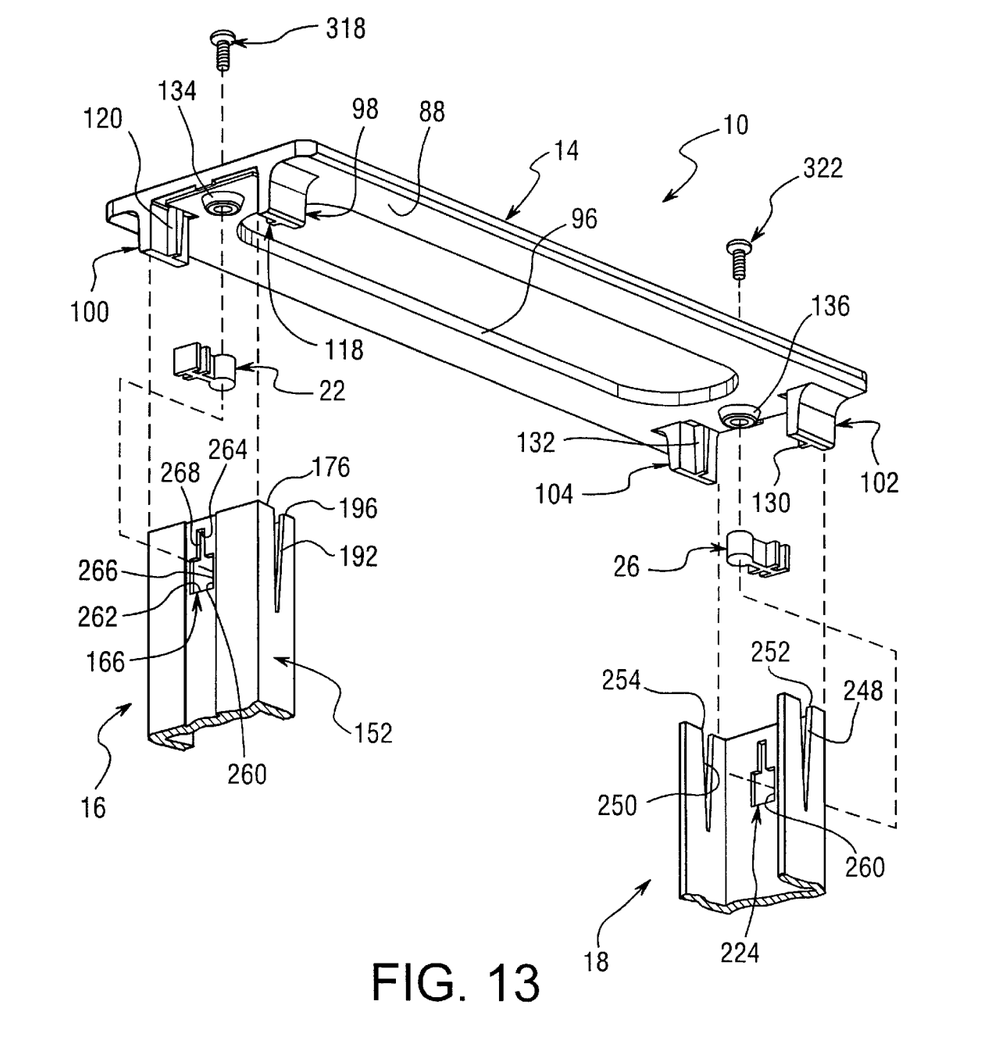
FIG. 13 is a perspective view of the relay rack assembly illustrated in FIG. 1, showing the assembly of the top support and the vertical members of the rack.

Lower surface 88 includes first and second guide portions 98 and 100 disposed adjacent first end 90 forming a first pair of guides for receiving first vertical member 16, as seen in FIGS. 4 and 13. Remote from first and second guide portions 98 and 100, third and fourth guide portions 102 and 104 are disposed on lower surface 88 adjacent second end 92, forming a second pair of guides for receiving second vertical member 18. Like base 12, although it is preferably that guide portions 98 and 100 be disposed adjacent first end 90, and guide portions 102 and 104 be disposed adjacent second end 92, the guide portions can be spaced from the ends 90 and 92. Each of the guide portions 98, 100, 102, and 104 extend downwardly from lower surface 88 with a bottom end 106 of each guide portion 98, 100, 102, and 104 being connected to top 14 and a top end 108 being a free end so that each guide portion 98, 100, 102, and 104 is substantially perpendicular to lower surface 88 of top 14, as seen in FIG. 4. Guide portions 98, 100, 102, and 104 can either be unitarily formed with top 14 or separately formed and fixedly connected therewith.

First and second guide portions 98 and 100 of top 14 each have an inner engaging surface 110 and 112, respectively, where inner surface 110 of first guide portion 98 faces inner surface 112 of second guide portion 100, and vice versa, forming a space therebetween for receiving first vertical member 16. Inner surfaces 110 and 112 are generally planar. Opposite inner engaging surfaces 110 and 112 are outer surfaces 114 and 116 of first and second guide portions 98 and 100, respectively. Outer surface 114 and 116 are slightly tapered from their bottom ends 106 to there top ends 108 to provide strength to the guide portions. However, outer surfaces 114 and 116 can be planar.

Each inner engaging surface 110 and 112 of first and second guide portions 98 and 100 include first and second outwardly extending engaging ribs 118 and 120, respectively, that extend from their top ends 52 to their bottom ends 50. First and second engaging ribs 118 and 120 are centrally disposed on inner surfaces 110 and 112 and are generally perpendicular to lower surface 88 of top 14.

Third and fourth guide portions 102 and 104 are substantially identical to first and second guide portions 98 and 100, as seen in FIG. 4. Similar to first and second guide portions 98 and 100, each of third and fourth guide portions 102 and 104 have an inner engaging surface 122 and 124, respectively, where inner surface 122 of third guide portion 102 faces inner surface 124 of fourth guide portion 104 forming a space therebetween for receiving second vertical member 18. Outer surfaces 126 and 128 are slightly tapered from bottom ends 106 to top ends 108 of guide portions 102 and 104, like outer surfaces 112 and 114 of first and second guide portions 98 and 100. Outer surfaces 126 and 128, however, can also be planar.

Third and fourth guide portions 102 and 104 also include third and fourth engaging ribs 130 and 132, respectively, that extend outwardly and along inner surfaces 122 and 124, respectively, from the top ends 108 to the bottom ends 106 of third and fourth guide portions 102 and 104. Like ribs 118 and 120 of first and second guide portions 98 and 100, third and fourth ribs 130 and 132 are centrally disposed on third and fourth guide portions 102 and 104, respectively, and are substantially perpendicular to lower surface 88 of top 14.

Similar to ribs 62, 64, 74 and 76, of base 12, ribs 118, 120, 130 and 132 of first, second, third, and fourth guide portions 98, 100, 102, and 104, respectively, are shown as being centrally located, ribs 98, 100, 102, and 104 can be located anywhere on inner surfaces 110, 112, 122, and 124, respectively, such as to one side or the other, as long as ribs 98, 100, 102, and 104 are generally perpendicular to lower surface 88. In addition, it is not necessary that ribs 118, 120, 130 and 132 extend from top ends .108 to bottom ends 106, rather, they can extend any distance along inner surfaces 110, 112, 122, and 124, respectively, such as half or three-fourths of the distance defined between top ends 108 and bottom ends 106 of first, second, third, and fourth guide portions 98, 100, 102, and 104. Also, although the length of first, second, third, and fourth guide portions 98, 100, 102, and 104 of top 14 defined between top ends 108 and bottom ends 106 is generally less than the length of first, second, third, and fourth guide portions 42, 44, 46, and 48 of base 12, they can be the same length or greater than guide portions 42, 44, 46, and 48.

In the space between first and second guide portions 98 and 100, a fastener stop 134 is disposed on lower surface 88, as seen in FIG. 4. Likewise, in the space between third and fourth guide portions 102 and 104 is located another fastener stop 136. Fastener stops 134 and 136 engage third and fourth fastener inserts 24 and 26 and can be integrally formed with top 14 or separately formed and attached to top 14 by any known attachment. Also, like base 12, in the spaces between the guide portions are first and second shallow grooves 138 and 140, respectively. First groove 138 is located between first and second guide portions 98 and 100 along first end 90 of top 14 and along the bottom ends 106 of guide portions 98 and 100. Similarly, second groove 140 is located between third and fourth guide portions 102 and 104 along second end 92 of top 14 and along the bottom ends 106 of guide portions 102 and 104. Grooves 138 and 140 receive first and second vertical members 16 and 18, respectively.

First vertical member 16 includes a first or bottom end 142 coupled to base 12 and a second or top end 144 coupled to top 14, as seen in FIG. 1. In particular, first vertical member 16 includes a main wall 146 with opposing substantially planar inner and outer surfaces 148 and 150, and first and second sidewalls 152 and 154 extending from opposing side edges of main wall 146 such that they are substantially perpendicular to main wall 146 forming a U-shaped vertical member 16 in section traverse to the length of vertical member 16.

Figures 5, 7:
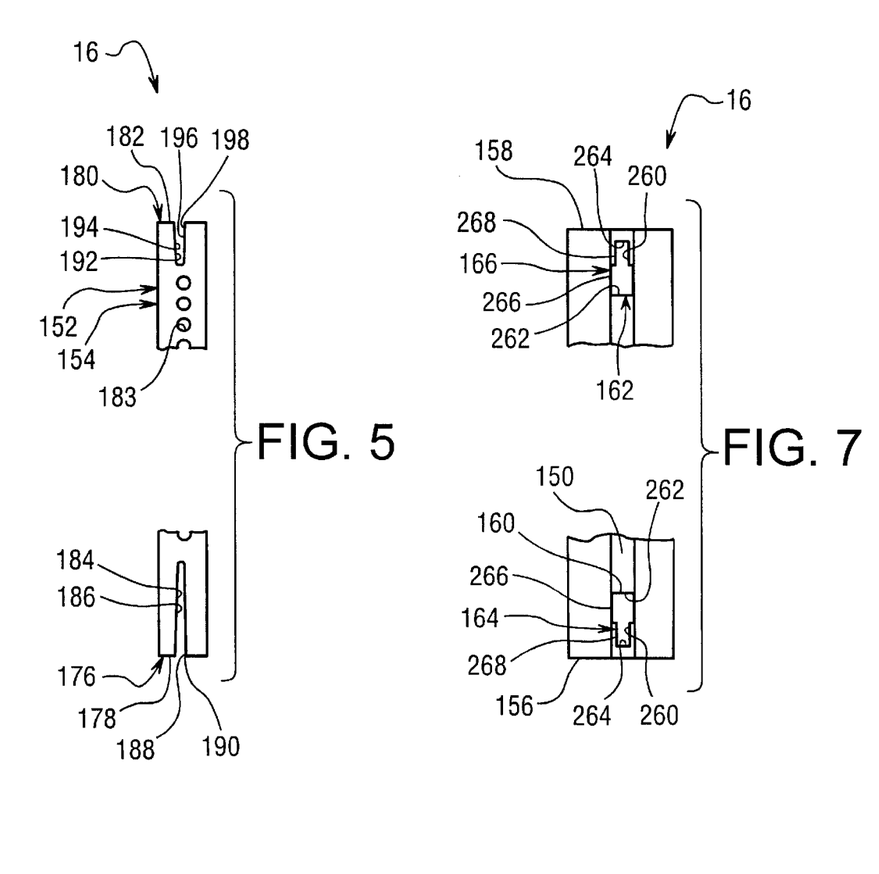
FIG. 5 is a side elevational view of a first vertical member of the relay rack assembly illustrated in FIG. 1, showing slots disposed in the vertical member.
FIG. 7 is a front elevational view of a first vertical member of the relay rack assembly illustrated in FIG. 1, showing fastener openings disposed in the vertical member.

Main wall 146 particularly includes a bottom edge 156 that abuts base 12 and a top edge 158 that abuts top 14, as seen in FIG. 7. Main wall 146 further has a first fastener upwardly facing surface 160 for engaging first fastener insert 20 disposed proximate bottom end 142 of vertical member 16, and a second fastener upwardly facing surface 162 for engaging second fastener 22 disposed proximate top end 144. Each of first and second fastener upwardly facing surfaces 160 and 162 has first and second fastener openings 164 and 166, respectively, for receiving a portion of first and second fastener inserts 20 and 22, respectively. A plurality of ganging holes 167 can be optionally disposed in and along main wall 146 either allowing another relay rack (not shown) to be ganged with relay rack 10 or allowing a channel member (not shown) that holds and directs the cable wires to be mounted to vertical 16, as seen in FIG. 1. In addition, support walls 151 may be disposed on main wall 146 for additional reinforcement.

Figure 6:
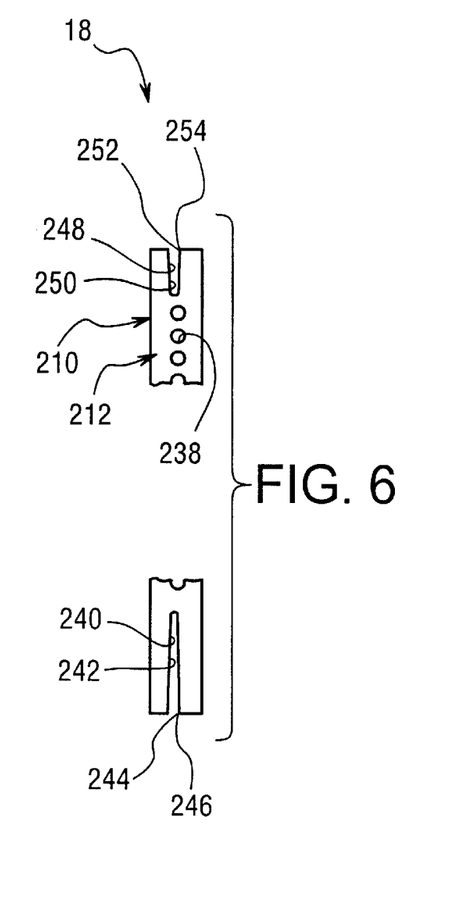
FIG. 6 is a side elevational view of a second vertical member of the relay rack assembly illustrated in FIG. 1, showing slots disposed in the vertical member.

First and second sidewalls 152 and 154 each include substantially planar inner surfaces 168 and 170, respectively, and substantially planar outer surfaces 172 and 174, respectively, as seen in FIGS. 1, 5 and 6. Each sidewall 152 and 154 extends the length of main wall 146 such that bottom edges 176 and 178 of first and second sidewalls 152 and 154, respectively, are generally flush with bottom edge 156 of main wall 146. Similarly, top edges 180 and 182 of first and second sidewalls 152 and 154, respectively, are generally flush with top edge 158 of main wall 146. Also, a plurality of holes 183 are disposed along the length of first and second sidewalls 152 and 154 for mounting electrical equipment, such as cross-connect product 28, to the rack 10.

Each of first and second sidewalls 152 and 154 includes a first slot 184 and 186, respectively, disposed adjacent bottom edges 176 and 178, for receiving first and second engaging ribs 62 and 64 of base 12, as seen in FIGS. 2, 5 and 6. First slots 184 and 186 are shaped to receive ribs 62 and 64 and preferably have a substantially elongated triangular shape to provide a tight fit with ribs 62 and 64. However, the shape of first slots 184 and 186 may be more rectangular as long as the slots conform to the shape of ribs 62 and 64. In addition, first slots 184 and 186 have an access opening 188 and 190, respectively, disposed in bottom edges 176 and 178, respectively, allowing ribs 62 and 64 to be inserted therein. Slots 184 and 186 are generally centrally disposed on sidewalls 152 and 154 thereby corresponding to the location of ribs 62 and 64 on first and second guide portions 42 and 44. However, slots 184 and 186 can be located to the side as long as they correspond to ribs 62 and 64. Also, preferably, the height or length of first slots 184 and 186 generally conforms to the height or length of ribs 62 and 64.

Opposite first slots 184 and 186 are second slots 192 and 194 for engaging first and second engaging ribs 118 and 120 of top 14, as seen in FIGS. 5 and 6. Second slots 192 and 194 are substantially identical to first slots 184 and 186 and thus will be briefly described. Similar to first slots 184 and 186, the shape and height of second slots 192 and 194 conforms to the shape and height of first and second engaging ribs 118 and 120 and are disposed adjacent top edges 180 and 182. Access openings 196 and 198 are disposed in top edges 180 and 812, respectively, allowing ribs 118 and 120 to be inserted therein, as seen in FIGS. 5 and 6. The height or length of second slots 192 and 194 is generally less than that of first slots 184 and 186 since the height or length of ribs 118 and 120 is less than ribs 62 and 64. However, second slots 192 and 194 can be of any height along as they conform to ribs 118 and 120.

Second vertical member 18 is substantially identical to first vertical member 16. Second vertical member 18 includes a first or bottom end 200 coupled to base 12 and a second or top end 202 coupled to top 14, as seen in FIG. 1. Like first vertical member 16, second vertical member 18 includes a planar main wall 204 with inner surface and an opposing outer surface 208, and first and second sidewalls 210 and 212 extending from opposing side edges of main wall 204 forming a U-shaped vertical member 18 in section, as seen in FIGS. 1 and 2.

Figure 8:
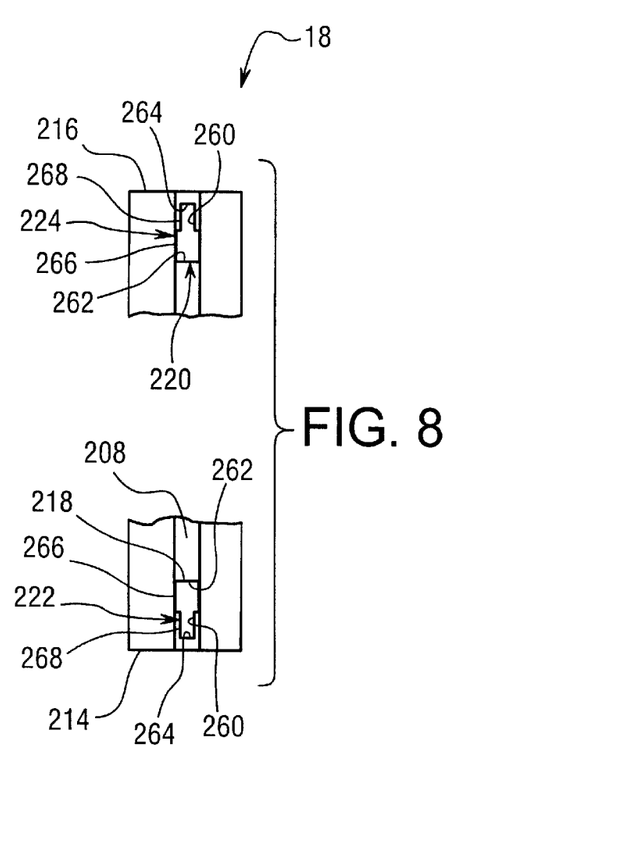
FIG. 8 is a front elevational view of a second vertical member of the relay rack assembly illustrated in FIG. 1, showing fastener openings disposed in the vertical member.

Main wall 204 of second vertical member 18 includes a bottom edge 214 that abuts base 12, a top edge 216 that abuts top 14, a third fastener upwardly facing surface 218 for engaging third fastener insert 24 disposed proximate bottom edge 214, and a fourth fastener upwardly facing surface 220 for engaging fourth fastener insert 26 disposed proximate top edge 216, as seen in FIGS. 1, 7 and 8. Each of third and fourth fastener upwardly facing surfaces 218 and 220 have third and fourth fastener openings 222 and 224, respectively, for receiving a portion of third and fourth fastener inserts 24 and 26, respectively. Ganging holes 226 can be optionally disposed in and along main wall 204 either allowing another relay rack to be ganged with relay rack 10 or allowing a channel member to be mounted to vertical 18. In addition, support walls 228 may be disposed on main wall 204 for additional reinforcement.

First and second sidewalls 210 and 212 of second vertical member 18 each include substantially planar inner surfaces 230 and 232, respectively, and substantially planar outer surfaces 234, respectively, and they extend the length of main wall 204 like sideswalls 152 and 154 of first vertical member 16. Also, a plurality of holes 238 are disposed along the length of first and second sidewalls 210 and 212.

Each of first and second sidewalls 210 and 212 includes a third slot 240 and 242, respectively, disposed adjacent bottom edge 214, for receiving third and fourth engaging ribs 74 and 76 of base 12. Like first slots 184 and 186 of first vertical member 16, the shape and height of third slots 240 and 242 conforms to the shape of third and fourth engaging ribs 74 and 76. Also, each of third slots 240 and 242 have an access opening 244 and 246, respectively, disposed in bottom edges of sidewalls 210 and 212, respectively, allowing ribs 74 and 76 to be inserted therein. Similar to first slots 184 and 186 of first vertical member 16, third slots 240 and 242 are generally centrally disposed on sidewalls 210 and 212 thereby corresponding to the location of ribs 74 and 76 on third and fourth guide portions 46 and 48.

Opposite third slots 240 and 242 are fourth slots 248 and 250 for engaging third and fourth engaging ribs 130 and 132 of top 14, as seen in FIGS. 4, 5 and 6. Fourth slots 192 and 194 are substantially identical to second slots 192 and 194 of first vertical member. Similar to second slots 192 and 194, the shape and height of fourth slots 248 and 250 conforms to the shape and height of third and fourth engaging ribs 130 and 132 and are disposed adjacent top edge 216. Access openings 252 and 254 are disposed in top edges of sidewalls 210 and 212, respectively, allowing ribs 130 and 132 to be inserted therein.

First, second, third, and fourth fastener openings 164, 166, 222, and 224 located in main walls 146 and 204 of first and second vertical member 16 and 18, respectively, are substantially identical, therefore like numbers will be used to describe all of the openings. As seen in FIGS. 7 and 8, first and third fasteners openings 164 and 22 are generally centrally disposed and located near bottom edges 156 and 214 of first and second vertical members 16 and 18, respectively. Similarly, second and fourth fastener openings 166 and 224 are generally centrally disposed and located near top edges 158 and 216 of first and second vertical members 16 and 18, respectively.

Each of first, second, third, and fourth fastener openings 164, 166, 222, and 224 are defined by an outer peripheral edge 260 with opposing top and bottom surfaces 262 and 264. Outer edge 260 defines first and second sections 266 and 268. First and second sections 266 and 268 are generally rectangular with the width of first section 266 is greater than the width of second section 268 allowing a fastener insert to extend through first section 268. However, it is not necessary that first and second sections 266 and 268 be rectangular, instead they can be more square or circular, as long as a fastener insert can extend through first section 266 and engage second section 268, as will be described further below.

Figure 9:
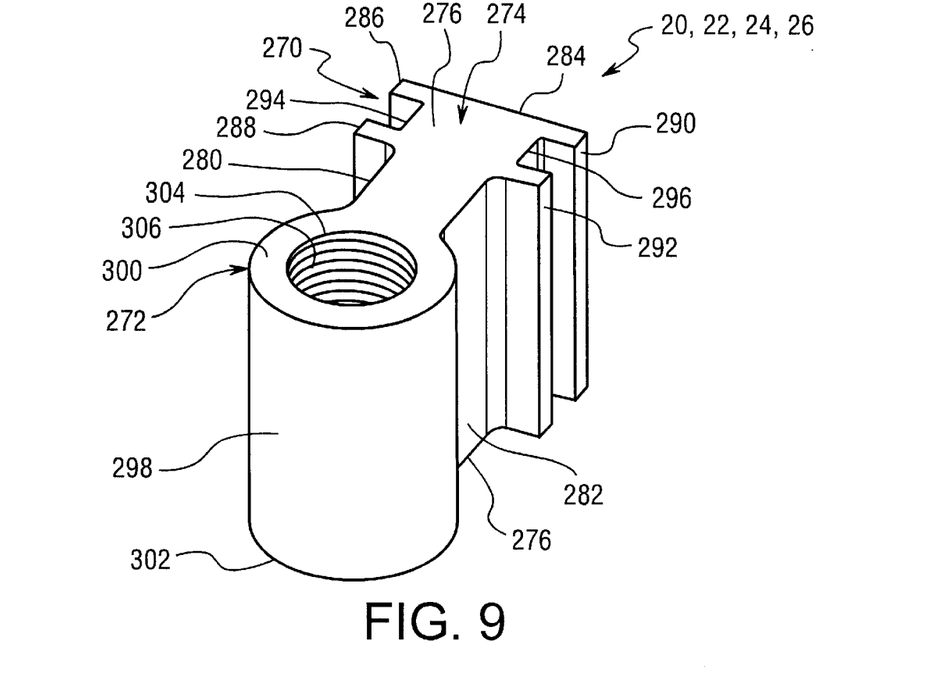
FIG. 9 is a perspective view of the fastener insert of the relay rack assembly illustrated in FIG. 1.

First, second, third, and fourth fastener inserts 20, 22, 24, 26, are substantially identical therefore like numbers will be used to describe all of the inserts, as seen in FIG. 7. Each of first, second, third, and fourth fastener inserts 20, 22, 24, 26 includes a first portion 270 and a second portion 272. First portion 270 particularly includes a main body 274 with substantially planar opposing top and bottom surfaces 276 and 278, substantially planar first and second abutting surfaces 280 and 282 that extend between and are substantially perpendicular to top and bottom surface 276 and 278, and an end wall 284 remote from second portion 272. Extending from first abutting surface 280 are first and second ridges 286 and 288 and extending from second abutting surface 282 are first and second ridges 290 and 292. In particular, first ridges 286 and 290 extend outwardly from opposing sides of end wall 284 and second ridges 288 and 292 extend outwardly from first and second abutting surfaces 280 and 282, respectively, spaced from first ridges 286 and 290 forming first and second engaging channels 294 and 296 between first and second ridges 286 and 288 and first and second ridges 290 and 292. Ridges 286, 288, 290 and 292 being substantially perpendicular to main body 274.

Second portion 272 extends from main body 274 of first portion 270 remote from end wall 284. Second portion 272 has a substantially cylindrical body 298 with opposing top and bottom surfaces 300 and 302 and an inner bore 304 that includes a threaded surface 306 for receiving a fastener, such as a screw. Top and bottom surfaces 300 and 302 of second portion 272 are aligned with top and bottom surface 276 and 278 of first portion 270 such that first and second portions 270 and 272 form one unitary fastener insert.

Assembly

Figure 11:
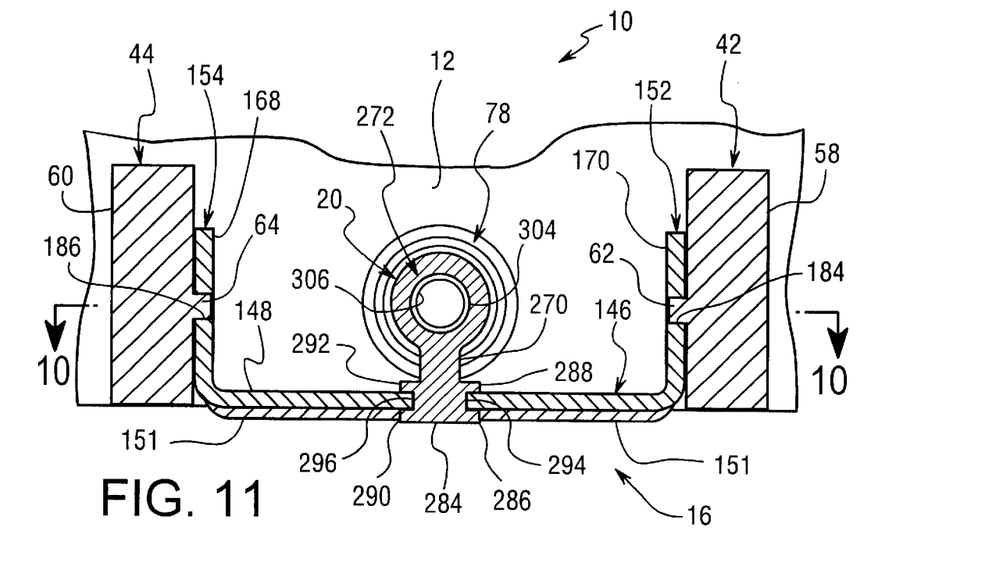
FIG. 11 is a top plan view in cross section of the relay rack assembly taken along line 11—11 of FIG. 2, showing the engagement of a fastener insert with one vertical member of the relay rack assembly.
Figure 12:
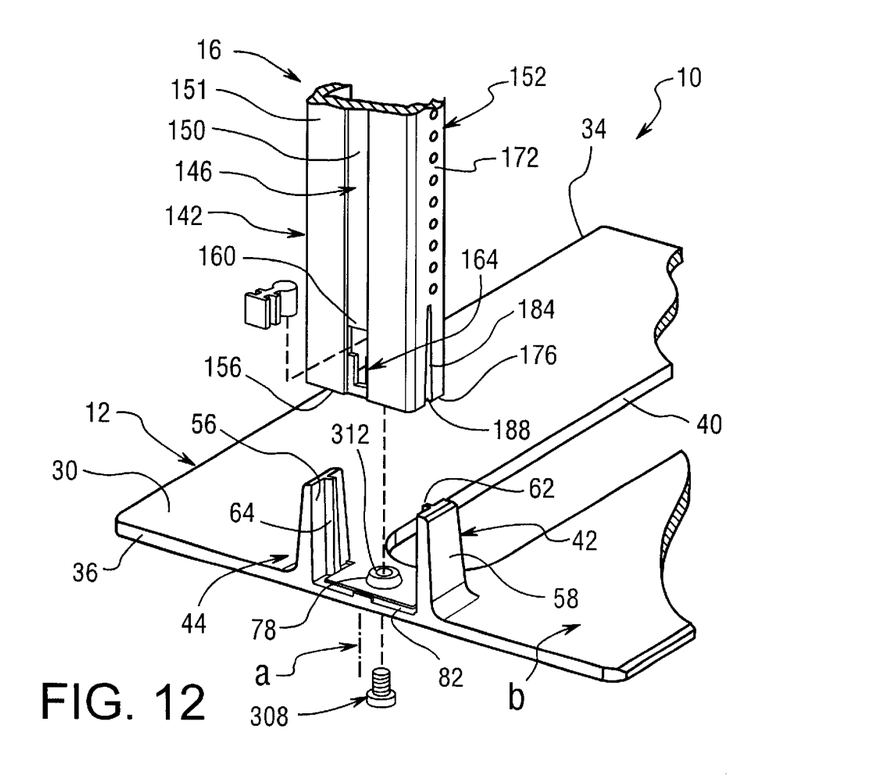
FIG. 12 is a perspective view of the relay rack assembly illustrated in FIG. 1, showing the assembly of the base support and the vertical members of the rack.

Referring to FIGS. 1–13, relay rack 10 is self-squaring, that is, it will automatically square first and second vertical member 16 and 18 with respect to base 12 and top 14 upon assembly. In particular, first and second vertical members 16 and 18 are square to base 12 and top 14 when they are substantially parallel to one another and perpendicular to planar upper and lower surfaces 30 and 88 of base 12 and top 14, respectively, such that vertical members 16 and 18 are not angled in any direction, such as inwardly or outwardly, and forwardly or backwardly with respect to the rack 10. For example, the axis a of the vertical member 16 is square when it is substantially perpendicular to plane b of base 12, as best seen in FIG. 12. In addition, the first ends 36 and 90 of vertical members 16 and 18, respectively, are substantially prevented from moving laterally with respect to upper surface 30 of base 12. Likewise, the second ends 38 and 92 of vertical members 16 and 18, respectively, are substantially prevented from moving laterally with respect to lower surface 88 of top 14.

In general, to assemble relay rack 10, first and second vertical members 16 and 18 are inserted between the guide portions of base 12, then they are inserted between the guide portions of top 14, and finally first, second, third, and fourth fastener inserts 20, 22, 24, and 26 are secured to vertical members 16 and 18, base 12, and top 14.

Figure 10:
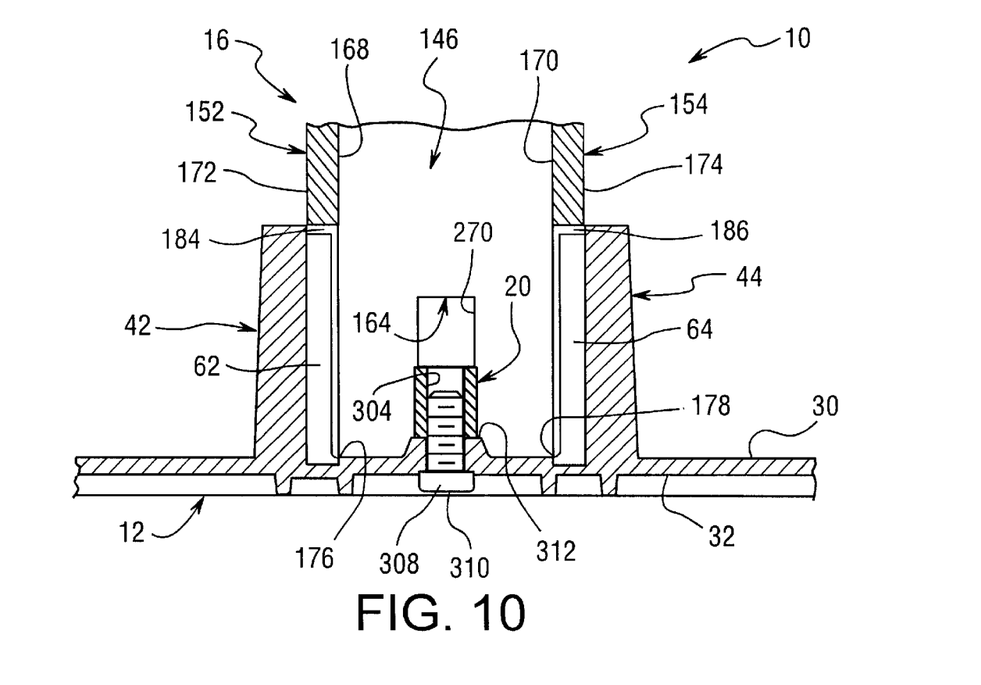
FIG. 10 is a side elevational view in cross section of the relay rack assembly taken along line 10—10 of FIG. 11, showing the engagement of one vertical member with the base support of the relay rack assembly.

In particular, the first or bottom end 36 of first vertical member 16 is inserted into the space between first and second guide portions 42 and 44 on base 12 by sliding first and second sidewalls 152 and 154 with respect to inner engaging surfaces 54 and 56 of first and second guide portions 42 and 44, respectively, as seen in FIG. 10. While sliding, first slots 184 and 186 engage and extend over first and second engaging ribs 62 and 64 forming a substantially tight fit therewith such that inner engaging surfaces 54 and 56 abut outer surfaces 172 and 174 of first and second sidewalls 152 and 154 and bottom edges 156, 176, and 178 of first vertical member rest in first groove 82. The V-shaped slots square the vertical member with respect to base when they engage the ribs of the guide portions. Vertical member 16 is now substantially perpendicular to upper surface 30 of base 12 and is restricted from moving out of that position due to the engagement of ribs 62 and 64 and first slots 184 and 186.

First fastener insert 20 can then be secured to first vertical member 16 and base 12, as seen in FIG. 12. Specifically, first portion 270 of insert 20 is inserted through first section 266 of first fastener opening 164 which has a width that allows insert 20 to clear outer edge 260 of fastener opening 164. Second portion 272 is also extended through the first section 266 of opening 164 until first ridges 286 and 290 clear outer edge 260 of opening 164. Fastener insert 20 can then be dropped down into the second section 268 of opening 164 such that main wall 146 of first vertical member 16 at outer edge 260 is received in channels 294 and 296 of insert 20, as best seen in FIGS. 10 and 11. The bottom surface 278 of first portion 270 of insert 20 abuts the bottom surface 264 of opening 164, and the bottom surface 302 of second portion 272 of insert 20 abuts fastener stop 78 disposed on upper surface 30 of base 12. A fastener 308 is then extended through an opening 310 in base 12 and an opening 312 in fastener stop 78 that corresponds to opening 310 and engages threaded surface 306 of insert 20. Tightening fastener 308 secures first vertical member 16 to base 12 such that vertical member 16 remains square with base 12.

Bottom or first end 200 of second vertical member 18 can next be inserted into third and fourth guide portions 46 and 48 of base 12 in that same manner as describe above with respect to first vertical member, and thus those steps will not be repeated. Specifically, third slots 240 and 242 in sidewalls 210 and 212 engage third and fourth engaging ribs 74 and 76, like first slots 184 and 186 and first and second engaging ribs 62 and 64, such that bottom edge 214 of second vertical member 18 rests in second groove 84 disposed in upper surface 30 of base 12.

Like vertical member 16, vertical member 18 is now substantially perpendicular to upper surface 30 of base 12 and is restricted from moving out of that position due to the engagement of ribs 74 and 76 and third slots 240 and 242. Third fastener insert 24 can then be secured to second vertical member 18 and base 12 in the same manner as first fastener insert 20 with base 12 and therefore those steps will not be repeated. In particular, third fastener insert 24 is inserted through and engages third fastener opening 222, such that the bottom surface 278 of first portion 270 of insert 24 abuts the bottom surface 264 of opening 222, and the bottom surface 302 of second portion 272 of insert 24 abuts fastener stop 80 disposed on upper surface 30 of base 12. A fastener is then extended through an opening in base 12 and an opening 316 in fastener stop 80 that corresponds to the opening in base 12 and engages threaded surface 306 of insert 24. Tightening the fastener secures second vertical member 16 to base 12 such that vertical member 18 remains square with base 12.

Once first and second vertical members 16 and 18 are substantially square with base 12, the process is repeated to securing the top ends 144 and 202 of first and second vertical members 16 and 18, respectively, to top 14, as seen in FIG. 13. Specifically, the top end 144 of first vertical member 16 is inserted into the space between first and second guide portions 98 and 100 on top 14 by sliding first and second sidewalls 152 and 154 with respect to inner engaging surfaces 110 and 112 of first and second guide portions 98 and 100, respectively. While sliding, second slots 192 and 194 engage and extend over first and second engaging ribs 118 and 120 forming a substantially tight fit therewith such that inner engaging surfaces 110 and 112 abut outer surfaces 172 and 174 of first and second sidewalls 152 and 154 and top edges 158, 180 and 182 of first vertical member 16 rest in first groove 138 disposed in lower surface 88 of top 14. Vertical member 16 is now substantially perpendicular to lower surface 88 of top 14 and is restricted from moving out of that position due to the engagement of ribs 118 and 120 and second slots 192 and 194.

Second fastener insert 22 can then be secured to first vertical member 16 and top 14 in the same manner as first fastener insert 20 with base 12 and therefore those steps will not be repeated. In particular, second fastener insert 22 is inserted through and engages second fastener opening 166, such that the bottom surface 278 of first portion 270 of insert 22 abuts the bottom surface 264 of opening 166, and the bottom surface 302 of second portion 272 of insert 22 abuts fastener stop 134 disposed on lower surface 88 of top 14. A fastener 318 is then extended through an opening in top 14 and an opening 320 in fastener stop 134 that corresponds to the opening in top 14 and engages threaded surface 306 of insert 22. Tightening fastener 318 secures first vertical member 16 to top 14 such that vertical member 16 remains square with base 12.

Substantially simultaneously with engaging first vertical member 16 with top 14, second vertical member 18 also engages top 14 in the same manner, thus those steps will not be repeated. Specifically, fourth slots 248 and 250 in sidewalls 210 and 212 engage third and fourth engaging ribs 130 and 132 of third and fourth guide portions 102 and 104 of top 14, such that top edge 216 second vertical member 18 rests in second groove 140 disposed in lower surface 88 of top 14.

As with vertical member 16, vertical member 18 is now substantially perpendicular to lower surface 88 of top 14 and is restricted from moving out of that position due to the engagement of ribs 130 and 132 and fourth slots 248 and 250. Fourth fastener insert 26 can then be secured to second vertical member 18 and top 14 in the same manner as second fastener insert 22 with top 14 and therefore those steps will not be repeated. In particular, fourth fastener insert 26 is inserted through and engages fourth fastener opening 224, such that the bottom surface 278 of first portion 270 of insert 26 abuts the bottom surface 264 of opening 224, and the bottom surface 302 of second portion 272 of insert 26 abuts fastener stop 136 disposed on lower surface 88 of top 14. A fastener 322 is then extended through an opening in top 14 and an opening 324 in fastener stop 136 that corresponds to the opening in top 14 and engages threaded surface 306 of insert 26. Tightening fastener 322 secures second vertical member 16 to top 14 such that vertical member 18 remains square with top 14.

While a particular embodiment has been chosen to illustrate the invention, it will be understood by those skilled in the art that various changes and modifications can be made therein without departing from the scope of the invention as defined in the appended claims. For example, the securing of first and second vertical members 16 and 18 to base 12 can be in any order, that is first vertical member 16 can be secured either first or second and second vertical member 18 can be secured either first or second. Similarly, the vertical members 16 and 18 can be secured either to the base first or the top first. In addition, the fastener inserts 20, 22, 24, and 26 can be secured at any time, such as before after both the vertical members 16 and 18 are engaged with top 14 and base 12 or sometime in between there. Moreover, the fastener inserts 20, 22, 24, and 26 can be inserted through their respective fastener openings in first and second vertical members prior to engaging the vertical members 16 and 18 with base 12 and top 14.

What is claimed is:

1. A relay rack assembly, comprising:
    a base having upper and lower surfaces, and a first guide portion extending from said upper surface and having a first engaging rib extending therefrom;
    a first vertical member coupled at one end to said base and having a main wall, and a first sidewall extending from said main wall, said main wall including a first fastener upwardly facing surface proximate said one end, and said first sidewall including a first slot engaging said first engaging rib; and
    a first fastener insert having first and second portions, said first portion being engaged with said first fastener upwardly facing surface of said first vertical member and said second portion being releasably attached to said upper surface of said base,
    whereby the attachment of said first fastener insert and the engagement of said first engaging rib and said first slot supports said first vertical member substantially perpendicular to said base.

2. A relay rack assembly according to claim 1, wherein said base includes a second guide portion spaced from said first guide portion, said second guide portion includes a second engaging rib extending therefrom; and
    said first vertical member includes a second sidewall, said second sidewall having a second slot engaging said second engaging rib.

3. A relay rack assembly according to claim 1, wherein said first fastener upwardly facing surface is a first fastener opening defined by an outer peripheral edge; and
    said first portion of said first fastener insert having opposing first and second abutting surfaces, each of said first and second abutting surfaces having first and second ridges, respectively, and said first and second abutting surfaces abutting said outer peripheral edge of said first fastener opening with first and second surfaces of said main wall being disposed adjacent said first and second ridges, respectively.

4. A relay rack assembly according to claim 3, wherein said first and second abutting surfaces of said first portion include third and fourth ridges, respectively, such that said first surface of said main wall is disposed between said first and third ridges, and said second surface of said main wall is disposed between said second and fourth ridges.

5. A relay rack assembly according to claim 3, wherein said first fastener opening includes first and second sections with first and second widths, respectively, said first width being greater than said second width; and said first and second abutting surfaces of said first fastener insert abutting said outer peripheral edge of said first fastener opening at said second section.

6. A relay rack assembly according to claim 3, wherein said second portion of said first fastener insert is substantially cylindrical and includes an inner bore for receiving a fastener.

7. A relay rack assembly according to claim 6, wherein said first and second portions of said first fastener insert form a unitary one-piece member.

8. A relay rack assembly according to claim 1, further comprising
   a top having upper and lower surfaces, and a first guide portion extending from said lower surface with a first engaging rib extending therefrom; and
   said first sidewall of said first vertical member having a second slot remote from said first slot that engages said first engaging rib of said top.

9. A relay rack assembly according to claim 1, wherein said main panel includes a second fastener upwardly facing surface; and
   a second fastener insert having first and second portions, said first portion of said second fastener insert being engaged with said second fastener upwardly facing surface and said second portion being releasably attached to said lower surface of said top.

10. A relay rack assembly according to claim 9, wherein a second fastener upwardly facing surface is a second fastener opening.

11. A relay rack assembly according to claim 10, wherein said base includes a second guide portion having a second engaging rib extending therefrom; and
   said first vertical member includes a second sidewall having a first slot that engages said second engaging rib.

12. A relay rack assembly according to claim 11, wherein said base includes a third guide portion disposed on said upper surface remote from said first and second guide portions, said third guide portion having a third engaging rib extending therefrom.

13. A relay rack assembly according to claim 12, further comprising
   a second vertical member coupled at one end to said base, said second vertical member having a main wall, and a first sidewall extending from said main wall, said main wall includes a third fastener opening proximate said one end of said second vertical member, and said first sidewall includes a third slot that engages said third engaging rib of said base.

14. A relay rack assembly according to claim 13, further comprising
   a third fastener insert having first and second portions, said first portion of said third fastener insert being engaged with said third fastener opening and said second portion being releasably attached to said upper surface of said base.

15. A relay rack assembly, comprising:
   a base having upper and lower surfaces, and first and second guide portions extending from said upper surface, each of said first and second guide portions having first and second engaging ribs extending therefrom, respectively;
   a top having upper and lower surfaces, and first and second guide portions extending from said lower surface of said top, each of said first and second guide portions of said top having first and second engaging ribs extending therefrom, respectively;
   a first vertical member coupled at one end to said base and at an opposing end to said top, said first vertical member having a main wall, and opposing first and second sidewalls extending from said main wall, said main wall includes first and second fastener openings, said first fastener opening being disposed proximate said base and said second fastener opening being disposed proximate said top, and each of said first and second sidewalls includes first and second slots, each of said first slots of said first and second sidewalls, respectively, engaging said first and second engaging ribs of said base, respectively, and each of said second slots of said first and second sidewalls, respectively, engaging said first and second engaging ribs of said top, respectively;
   a first fastener insert having first and second portions, said first portion being disposed in said first fastener opening of said first vertical member and said second portion being releasably attached to said upper surface of said base; and
   a second fastener insert having first and second portions, said first portion of said second fastener insert being disposed in said second fastener opening of said first vertical member and said second portion being releasably attached to said lower surface of said top.

16. A relay rack assembly according to claim 15, wherein said base includes third and fourth guide portions disposed remote from said first and second guide portions of said base;
   said top includes third and fourth guide portions disposed remote from said first and second guide portions of said top.

17. A relay rack assembly according to claim 16, further comprising
   a second vertical member coupled at one end to said base and at an opposing end to said top, said second vertical member having a main wall, and opposing first and second sidewalls extending from said main wall, said main wall includes third and fourth fastener openings, said third fastener opening being disposed proximate said base and said fourth fastener opening being disposed proximate said top, and each of said first and second sidewalls include third and fourth slots, each of said third slots of said first and second sidewalls, respectively, engaging said third and fourth engaging ribs of said base, respectively, and each of said fourth slots of said first and second sidewalls, respectively, engaging said third and fourth engaging ribs of said top, respectively.

18. A vertical rack assembly according to claim 17, further comprising
   a third fastener insert having first and second portions, said first portion of said third fastener insert being disposed in said third fastener opening of said second vertical member and said second portion of said third fastener insert being releasably attached to said upper surface of said base; and
   a fourth fastener insert having first and second portions, said first portion of said fourth fastener insert being disposed in said fourth fastener opening of said second vertical member and said second portion of said fourth fastener insert being releasably attached to said lower surface of said top.

19. A method of assembling first and second vertical members with a base, the first and second vertical members having a longitudinal axis, and the base having a substantially planar surface, comprising the steps of:

sliding the first and second vertical members with respect to the base with the longitudinal axis of the first and second vertical members being substantially perpendicular to the surface of the base so that slots of the first and second vertical members, respectively, each receive an engaging rib disposed on the base thereby restricting the first and second vertical members from moving in any direction substantially parallel to the surface of the base;

releasably engaging the first and second vertical members with the base so that the longitudinal axis of the first and second vertical members are substantially perpendicular to the surface of the base and the first and second vertical members are restricted from moving in any direction substantially perpendicular to the plane of the base; and mounting a product between the first and second vertical members so that the product is supported by and aligned with the first and second vertical members.

20. A method of assembling a vertical member with a base according to claim 19, further comprising the step of:

applying a compressive force to the vertical member while sliding the vertical member with respect to the base.

21. A method of assembling a vertical member with a base according to claim 20, further comprising the step of:

fixedly securing the vertical member to the base.

22. A method of assembling a vertical member with a base, the vertical member having a main wall and a first sidewall extending from the main wall, the main wall includes a first fastener opening, and the first sidewall includes a first slot, and the base having upper and lower surfaces, and a first guide portion extending from the upper surface, the first guide portion having a first engaging rib extending therefrom, comprising the steps of:

placing the first sidewall of the vertical member adjacent the first guide portion of the base;

sliding the vertical member downwardly with respect to the first guide portion until the vertical member abuts the upper surface of the base such that the first slot of the first sidewall engages the first engaging rib of the first guide portion;

inserting a fastener insert having first and second portions into the fastener opening in the main wall of the vertical member; and attaching the second portion of the fastener insert to the upper surface of the base with the first portion of the fastener insert remaining in the fastener opening thereby squaring the vertical member with respect to the base.

23. A method of assembling a vertical member with a base according to claim 22, further comprising the step of placing a second sidewall of the vertical member adjacent to a second guide portion of the base prior to sliding the vertical member downwardly, the second sidewall of the vertical member having a first slot for engaging a second engaging rib disposed on the second guide portion of the base; and sliding the vertical member downwardly with respect to the second guide portion such that the first slot of the second sidewall engages the second engaging rib of the second guide portion.

24. A method of assembling a vertical member with a base according to claim 22, further comprising the step of inserting the fastener insert into the fastener opening in the main wall of the vertical member prior to placing the first sidewall of the vertical member adjacent to the first guide portion of the base.

25. A method of assembling a relay rack, the relay rack having a base, a top, and first and second vertical members, each of the base and top having upper and lower surfaces, and first, second, third, and fourth guide portions, and each of the first and second vertical members having a main wall and first and second sidewalls extending from the main wall, comprising the step of:

placing the first and second sidewalls of the first vertical member adjacent to the first and second guide portions of the base, respectively;

sliding the first vertical member downwardly with respect to the first and second guide portions until first vertical member abuts the upper surface the base such that a first slot disposed in the first and second sidewalls of the first vertical member, respectively, engage the first and second engaging ribs disposed on the first and second guide portions, respectively;

inserting a first fastener insert having first and second portions into a first fastener opening in the main wall of the first vertical member; and attaching the second portion of the first fastener insert to the upper surface of the base with the first portion of the first fastener insert remaining in the first fastener opening, thereby squaring the first vertical member with respect to the base.

26. A method of assembling a relay rack according to claim 25, further comprising the step of placing the first and second sidewalls of the second vertical member adjacent to third and fourth guide portions of the base, respectively, prior to inserting the first fastener insert into the first fastener opening of the first vertical member; and sliding the second vertical member downwardly with respect to the third and fourth guide portions until the second vertical member abuts the upper surface of the base such that a third slot disposed in the first and second sidewalls of the second vertical member, respectively, engage the third and fourth engaging ribs disposed on the third and fourth guide portions, respectively.

27. A method of assembling a relay rack according to claim 26, further comprising the step of placing the first and second guide portions of the top adjacent the first and second sidewalls of the first vertical member at an end remote from said base; and sliding the top downwardly with respect to the first vertical member until the lower surface of the top abuts the first vertical member such that a second slot disposed in the first and second sidewalls of the first vertical member, respectively, engages first and second engaging ribs disposed on the first and second guide portions of the top.

28. A method of assembling a relay rack according to claim 27, further comprising the step of placing the third and fourth guide portions of the top adjacent the first and second sidewalls of the second vertical member substantially simultaneously with placing the first and second guide portions of the top adjacent the first and second sidewalls of the first vertical member; and sliding the top downwardly with respect to the second vertical member until the lower surface of the top abuts the second vertical member such that a fourth slot disposed in the first and second sidewalls of the first vertical member, respectively, engages third and fourth engaging ribs disposed on the third and fourth guide portions of the top.

29. A method of assembling a relay rack according to claim 28, further comprising the step of inserting a second fastener insert having first and second portions into a second fastener opening in the main wall of the first vertical member; and attaching the second portion of the second fastener insert to the lower surface of the top with the first portion of the second fastener insert remaining in the second fastener opening, thereby squaring the first vertical member with respect to the top.

30. A method of assembling a relay rack according to claim 29, further comprising the step of inserting a third fastener insert having first and second portions into a third fastener opening in the main wall of the second vertical member; and attaching the second portion of the third fastener insert to the upper surface of the base with the first portion of the third fastener insert remaining in the third fastener opening, thereby squaring the second vertical member with respect to the base.

31. A method of assembling a relay rack according to claim 30, further comprising the step of inserting a fourth fastener insert having first and second portions into a fourth fastener opening in the main wall of the second vertical member; and attaching the second portion of the fourth fastener insert to the lower surface of the top with the first portion of the fourth fastener insert remaining in the fourth fastener opening, thereby squaring the second vertical member with respect to the top.

32. A method of assembling a relay rack according to claim 31, further comprising the step of inserting the third fastener insert into said second vertical member and attaching the third fastener insert to the base prior to inserting the second fastener insert into the first vertical member.

* * * * *